July 25, 1939.  G. E. BEGGS  2,167,328
LOAD MAINTAINER FOR MATERIALS TESTING APPARATUS
Filed Dec. 11, 1935
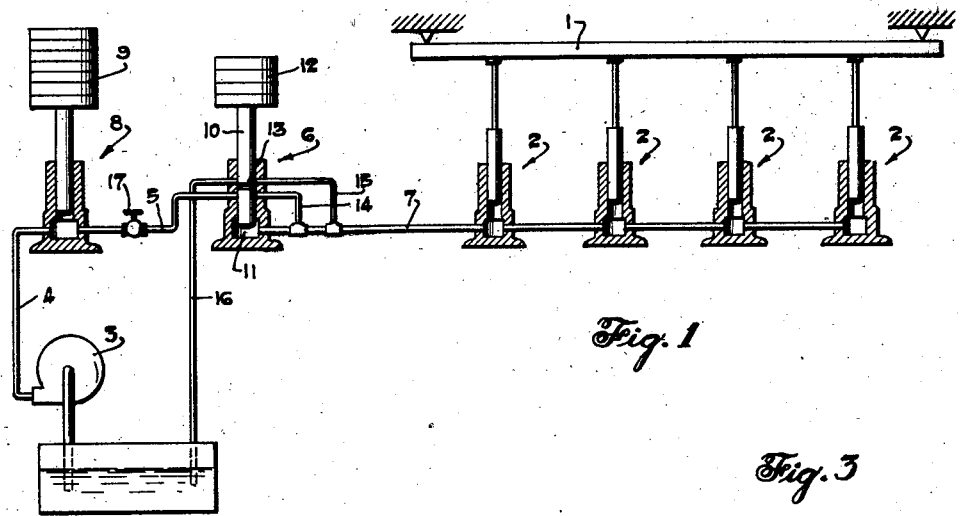
Fig. 1
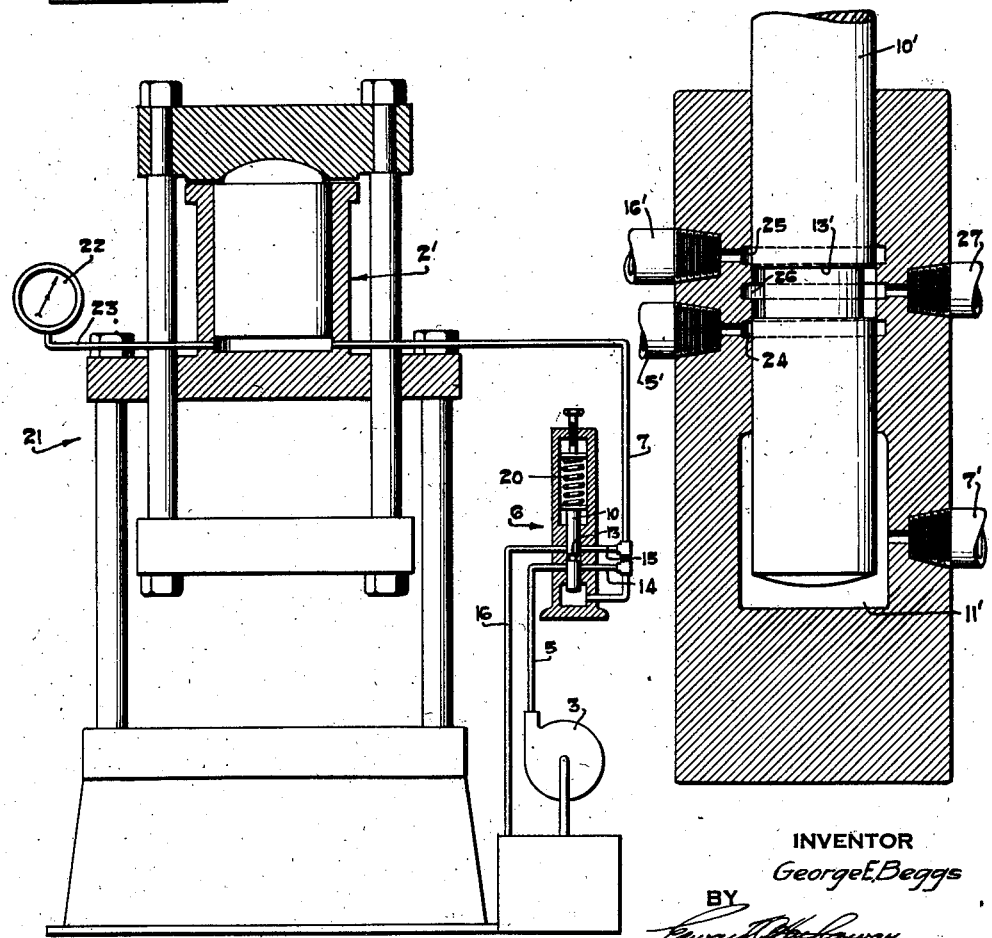
Fig. 2
Fig. 3
INVENTOR
George E. Beggs
BY
ATTORNEY Patented July 25, 1939

2,167,328

UNITED STATES PATENT OFFICE 2,167,328

LOAD MAINTAINER FOR MATERIALS TESTING APPARATUS

George E. Beggs, Princeton, N. J.

Application December 11, 1935, Serial No. 53,946

3 Claims. (Cl. 50—35)

This invention relates generally to materials testing apparatus and more particularly to improved means for maintaining a predetermined constant load on a specimen.

In the stress-strain studies of materials or structures, both of which will be herein referred to as specimens, it is often desirable to maintain a predetermined constant load thereon. Various devices and arrangements heretofore proposed and used for accomplishing this result have been either complicated and expensive or deficient in operation. It is accordingly one object of my invention to provide improved means for maintaining a predetermined constant load on a specimen and to accomplish this in a manner that is simple in construction, operation and maintenance and thoroughly reliable and accurate over a wide range of loads.

Other objects and advantages will be more apparent to those skilled in the art from the following description of the accompanying drawing in which:

Fig. 1 is a diagrammatic outline of one form of materials testing apparatus embodying my improved load maintainer;

Fig. 2 is a diagrammatic outline of a materials testing machine embodying my improved load maintainer;

Fig. 3 is an enlarged sectional view of a preferred form of load maintainer valve.

In the particular embodiment of the invention which is disclosed herein merely for the purpose of illustrating one specific form among possible others that the invention might take in practice, I have shown a suitably supported beam specimen 1 which can be taken as a diagrammatic representation of any desired structure to be subjected to load. This load may be applied by any one or more of a series of rams and cylinders generally indicated at 2. The rams are actuated by fluid pressure from any suitable source such as a pump 3 supplying fluid through pipes 4 and 5 and thence through my improved load maintainer 6 and pipe 7 to the various ram cylinders. An accumulator generally indicated at 8 may be employed to insure a uniform supply of fluid under a pressure determined either by a series of weights 9 or equivalent adjustable spring means to preload the accumulator.

The load maintainer comprises a cylinder having a combined plunger and valve 10 whose lower end is subjected to fluid pressure in a chamber 11, the plunger and cylinder preferably being lapped to eliminate friction. The plunger is normally preloaded to a predetermined value either by adjustable weights generally indicated at 12 or by equivalent adjustable spring means such as shown in another figure. An annular groove 13 is formed in ram 10 to alternatively connect supply pipe 5 with a pipe 14 or to connect a pipe 15 with exhaust pipe 16, the pipes 14 and 15 being connected to the main pipe 7.

In operation (Fig. 1), plunger 10 is preloaded by weights 12 either directly as shown or with a weight acting through a lever in accordance with the load desired to be maintained on the specimen. With no load on the specimen, plunger 10 would be in its lowermost position so as to connect pipes 5 and 14, whereupon operation of pump 3 would supply fluid through pipes 4 and 5 and adjustable throttle valve 17, thence through annular groove 13 and pipes 14 and 7 to the various loading cylinders 2. The pressure thereupon builds up in these cylinders and in chamber 11, thus raising plunger 10 until supply pipe 5 is cut off, due to annular groove 13 moving upwardly. If the pressure in the loading cylinders 2 should be excessive, then plunger 10 will be moved so as to cause groove 13 to connect pipes 15 and 16, thereby to exhaust some liquid from the loading cylinders until the pressure therein drops to a predetermined value. This drop in pressure would permit plunger 10 to lower and thus close pipe 15 to maintain pressure in the loading cylinders. On the other hand, if the pressure in the loading cylinders should fall below the desired value for any reason, such as when the specimen undergoes deformation, then this drop in pressure will permit plunger 10 to move downwardly and reconnect supply pipe 5 with pipe 14, thereby reestablishing the desired load on the specimen. From the foregoing it is seen that the valve passages operate to maintain an adequate volume of fluid in the loading system but that the plunger and its weight will always function to maintain constant loading pressure regardless of the elevation of the plunger and therefore the specimen load controlled as in Fig. 1 will be maintained constant. However, in the event of minute variable factors such as friction or inertia of parts, no matter how small or indeterminate such may be, said pressure is broadly referred to herein as substantially constant.

In Fig. 2, I have shown my improved load maintainer 6 applied to a materials testing machine 21 in which a load producing ram and cylinder 2' is actuated in the same manner as the ram and cylinders 2 of Fig. 1. The testing machines may employ any suitable load indicating apparatus 22 diagrammatically indicated as of the dial type operated by pressure transmitted through a pipe 23 from the load producing cylinder. The testing machine may be of any one of various hydraulic types adapted for tension or compression tests or both. The operation of this arrangement is identical to that described in connection with the disclosure of Fig. 1, and corresponding parts are therefore given the same reference numbers, it being noted however that an adjustable spring 20 determines within small limits the constant pressure to be maintained. Said limits are determined according to Hooke's law expressing the relationship between spring force and the change in length of the spring. These limits are so small for the range of operation herein considered that the pressure is substantially constant.

This form of load maintainer valve has been found to be important in avoiding any possibility of binding caused by unbalanced pressures or forces acting on the valve or controlled thereby. A very desirable form of valve is shown in Fig. 3 as having a supply groove 24, an exhaust groove 25 and an intermediate constant pressure groove 26, all of annular formation. The plunger 10' is provided with an annular groove 13' whose axial length is less than the distance between the inner edges of grooves 24 and 25, thereby providing a small positive lap for the inner edges of grooves 24 and 25 when the valve is in its neutral position. The amount of lap may be more than shown when the valve is operated with a weight as shown in Fig. 1. However, when a spring 20, Fig. 2, is used, the amount of lap is made very small, for the length of lap in this case determines the upper and lower limits of whatever pressure is to be maintained. Also by reason of the annular character of the grooves, the valve and cylinder are subjected to balanced pressures or forces at all times. A supply pipe 5' communicates with groove 24 while an exhaust pipe 16' communicates with groove 25. A pipe 27, Fig. 3, serves both functions of pipes 14 and 15, Figs. 1 and 2, because of its constant communication with grooves 26 and 13', the pipe 27 being connected to a pipe 7' which supplies load producing pressure to the specimen loading apparatus as well as to the pressure responsive chamber 11'.

The operation of the form shown in Fig. 3 is in principle identical to that of Figs. 1 and 2. With no load on the specimen, the valve plunger is in its lower position, thereby allowing fluid pressure to be supplied from pipe 5' through grooves 24 and 13' to pipe 27 and thence through pipe 7' to the load producing cylinder. As the loading pressure builds up in chamber 11', plunger 10' is raised until groove 24 is finally closed. If the loading pressure tends to exceed the desired value, then plunger 10' is raised still farther by pressure in chamber 11' so as to uncover groove 25 and thus permit fluid to be discharged from the loading cylinder through pipe 27, grooves 26, 13' and 25 to pipe 16' until the load producing pressure drops sufficiently to permit plunger 10' to lower and accordingly close groove 25. The plunger 10' when so controlled by a spring 20 will thus reciprocate within very small limits in response to the load producing pressure and thereby maintain a substantially constant load on the specimen.

From the foregoing disclosure it is seen that I have provided an extremely simple load maintainer apparatus adapted to be adjusted over a wide range to maintain a constant or a substantially constant predetermined load and which in actual practice has been found to be extremely effective and accurate.

It will of course be understood that various changes in details of construction and arrangement of parts may be made by those skilled in the art without departing from the spirit of the invention as set forth in the appended claims.

I claim:

1. A fluid load control mechanism for maintaining a constant pressure comprising, in combination, a cylinder having a closed end, a reciprocable plunger disposed in said cylinder and being of uniform diameter throughout that portion of its length having slidable contact with said cylinder, inlet and exhaust annular grooves in the wall of said cylinder and an annular groove in said plunger adapted to communicate directly with either of said other grooves, an outlet located in said cylinder between said inlet and exhaust annular grooves and communicating directly with said plunger groove, and means whereby said outlet communicates with the closed end of said cylinder thereby effecting axial plunger movement in accordance with the outlet pressure, said grooves being arranged so that axial movement of said plunger controls the admission of fluid from said inlet to said outlet and the discharge of fluid from said outlet to maintain a substantially constant pressure therein.

2. A fluid load control mechanism for maintaining a constant pressure comprising, in combination, a cylinder having a closed end, a reciprocable plunger therein of uniform diameter throughout that portion of its length having slidable contact with said cylinder, inlet and exhaust annular grooves and an intermediate constant pressure annular outlet groove formed in the wall of said cylinder, an annular groove in said plunger adapted to communicate directly with each of said other grooves, and means for allowing communication between said outlet groove and the closed end of said cylinder whereby axial plunger movement is effected in accordance with pressure in said outlet groove, all of said grooves being so spaced and of such axial dimensions that the plunger when in its neutral position is adapted to close both the inlet and exhaust grooves and is adapted to connect said exhaust groove and constant pressure groove upon occurrence of pressure in said outlet groove tending to be in excess or actually in excess of a predetermined value and to connect the inlet groove and constant pressure outlet groove upon tendency for decrease or for actual decrease of outlet pressure below said value, thereby to maintain a substantially constant pressure in said outlet.

3. A fluid load control mechanism for maintaining a constant pressure comprising, in combination, a cylinder having a closed end, a reciprocable plunger disposed in said cylinder, inlet and exhaust annular grooves in the wall of said cylinder and an annular groove in said plunger adapted to communicate directly with either of said other grooves, an outlet for said cylinder located between said inlet and exhaust grooves and communicating directly with the annular groove in said plunger, and means for allowing said outlet to communicate with said cylinder at only its closed end and at said point between the inlet and exhaust grooves thereby effecting axial plunger movement in accordance with the outlet pressure, said grooves being so arranged that axial movement of said plunger controls the admission of fluid from said inlet to said outlet and the discharge of fluid from said outlet to said exhaust to maintain a substantially constant pressure in said outlet.

GEORGE E. BEGGS.